United States Patent [19]

Yung

[11] Patent Number: 5,548,739

[45] Date of Patent: Aug. 20, 1996

[54] METHOD AND APPARATUS FOR RAPIDLY RETRIEVING DATA FROM A PHYSICALLY ADDRESSED DATA STORAGE STRUCTURE USING ADDRESS PAGE CROSSING PREDICTIVE ANNOTATIONS

[75] Inventor: Robert Yung, Fremont, Calif.

[73] Assignee: Sun Microsystems, Inc., Mountain View, Calif.

[21] Appl. No.: 148,685

[22] Filed: Nov. 4, 1993

[51] Int. Cl.$^6$ ............................ G06F 12/10; G06F 12/02; G06F 12/06; G06F 13/28
[52] U.S. Cl. ........................ 395/414; 395/481; 395/464; 395/465
[58] Field of Search ................................. 395/414, 481, 395/464, 465, 466, 474, 479

[56] References Cited

U.S. PATENT DOCUMENTS

| | | | |
|---|---|---|---|
| 4,821,169 | 4/1989 | Sites et al. | 395/416 |
| 4,912,626 | 3/1990 | Fiacconie | 395/451 |
| 5,060,188 | 10/1991 | Zullian et al. | 395/405 |
| 5,099,415 | 3/1992 | Osler et al. | 395/417 |
| 5,148,538 | 9/1992 | Celtruda et al. | 395/415 |
| 5,235,697 | 8/1993 | Steely, Jr. et al. | 395/464 |
| 5,278,963 | 1/1994 | Haffersley et al. | 395/414 |
| 5,283,880 | 2/1994 | Marcias-Garza | 395/445 |
| 5,287,487 | 2/1994 | Priem et al. | 394/414 |
| 5,361,391 | 11/1994 | Westberg | 395/464 |
| 5,418,922 | 5/1995 | Liu | 395/403 |

FOREIGN PATENT DOCUMENTS

| | | | |
|---|---|---|---|
| 0395835 | 11/1990 | European Pat. Off. | G06F 12/08 |
| 0424163 | 4/1991 | European Pat. Off. | G06F 12/10 |

OTHER PUBLICATIONS

IBM Technical Disclosure Bulletin, vol. 29, No. 3, Aug. 1986, p. 1380.

Primary Examiner—Tod R. Swann
Assistant Examiner—Tuan V. Thai
Attorney, Agent, or Firm—Blakely Sokoloff Taylor & Zafman

[57] ABSTRACT

In a computer system having a number of page partitioned and virtually addressed address spaces, a physically addressed data storage structure and its complementary selection data storage structure is provided with a complementary memory page crossing prediction storage structure, a latch, and a comparator. The memory page crossing prediction storage structure is used to store a number of memory page crossing predictive annotations corresponding to the contents of the data and selection data storage structures. Each memory page crossing predictive annotation predicts whether the current access crosses into a new memory page. The latch is used to successively record a first portion of each accessing physical address translated from a corresponding portion of each accessing virtual address. The recorded first portion of the physical address of the immediately preceding access is used to select data currently being read out of the storage structures, if the memory page crossing predictive annotation currently being read out predicts no memory page crossing. The comparator is used to determine whether the first portions of the physical addresses of the current and immediately preceding accesses are equal, if the first portion of the physical address of the immediately preceding access is used to select data for the current access. Remedial actions including invalidating the selected data and correcting the incorrect memory page crossing predictive annotation are taken, if the two physical address portions are determined to be unequal. As a result, most of the data retrievals are made without having to wait for the first portions of the accessing physical addresses to be translated, thereby improving the performance of retrieving data from the physically addressed data storage structure.

18 Claims, 5 Drawing Sheets

METHOD AND APPARATUS FOR RAPIDLY RETRIEVING DATA FROM A PHYSICALLY ADDRESSED DATA STORAGE STRUCTURE USING ADDRESS PAGE CROSSING PREDICTIVE ANNOTATIONS

BACKGROUND OF THE INVENTION

1. Field of the Invention

The present invention relates to the field of computer systems, in particular, data retrieval techniques in computer systems. More specifically, the present invention relates to data retrieval from a physically addressed data storage structure, e.g. a physically addressed set associative instruction cache.

2. Background

In order to expedite the availability of data and improve the overall system performance, there are many situations where a plurality of data vectors and their corresponding selection vectors are stored in an organized manner in complementary storage structures. A data vector is a collection of multiple data blocks, where each data block is in turn a collection of multiple data elements. A selection vector is a collection of corresponding selection elements. Such storage structures may be found in many general as well as special purpose computers regardless of their architectures. Perhaps the most well known example of such storage structures is a set associative cache. Another example is a multi-bank memory system. A not as well known example is a branch prediction table.

Additionally, to further expedite the availability of data and improve the overall system performance, many systems that support virtual addressing have taken the approach of accessing these storage structures with virtual addresses. Such an approach has the advantage of not having to wait for the virtual addresses to be translated into physical addresses. However, as the number of virtual address spaces supported increases, experience has shown that the overhead incurred during address space switching begins to outweigh the benefits of accessing these storage structures with virtual addressing. Thus, some virtual addressing systems that support large number of virtual address spaces have switched back to accessing these storage structures with physical addresses. Of course, the disadvantage is that the accesses cannot be completed until the virtual addresses are translated.

However, for storage structures whose sizes are larger than the memory page sizes of the systems and having a "sequential" access tendency, the translated portions of the accessing physical addresses tend to remain unchanged between successive accesses. Thus, it is desirable to exploit these characteristics and improve the performance of retrieving data from these storage structures. As will be disclosed, the present invention provides a method and apparatus for rapidly retrieving data from physically addressed data storage structures using memory page crossing predictive annotations, which achieves the objects and desired results described earlier by exploiting these characteristics.

SUMMARY OF THE INVENTION

The desired results of rapidly retrieving data from a physically addressed data storage structure having a complimentary selection data storage structure, in a computer system having a number of page partitioned virtual address spaces, is advantageously achieved by providing a complementary memory page crossing prediction storage structure for storing a number of memory page crossing predictive annotations corresponding to the contents of the data and selection data storage structures. In the presently preferred embodiment, each memory page crossing predictive annotation predicts whether the next access of the data storage structure crosses into a new memory page or not. The predictions are used to control whether selection of data during accesses are made speculatively without waiting for the physical addresses to be translated from the virtual addresses or nonspeculatively after the translations.

Under the presently preferred embodiment, the memory page crossing predictive annotations are initialized to predict no memory page crossings. Selection of data during a current access is made speculatively when the retrieved memory page crossing predictive annotation of the immediately preceding access predicts the current access is not going to cross into a new memory page, and non-speculatively when the immediately preceding retrieved annotation predicts memory page crossing. A first latch is provided to successively record the retrieved memory crossing predictive annotations, one at a time, thereby making available the predictive annotation of the immediately preceding access to the current access.

In an embodiment where a physical address is made up of an untranslated portion of the corresponding virtual address for accessing the various data structures, and a translated portion of the corresponding virtual address for selecting the accessed data, a second latch is further provided to successively record the translated portion of each accessing physical address, one at a time. In the event that data selection for the current access is to be made speculatively, the recorded translated portion of the physical address of the immediately preceding access is used to speculatively select data right away, without waiting for the translated portion of the physical address of the current access, thereby achieving the desired improvement in retrieval performance.

Lastly, a validation circuit is further provided to validate the speculative selections. Whenever data selection of the current access is made speculatively, the validation circuit determines whether the translated portions of the physical addresses of the immediately preceding and current accesses are the same or not. In the event the two translated portions are not the same, the validation circuit invalidates the speculatively selected data, and corrects the incorrect memory page crossing predictive annotation.

DETAILED DESCRIPTION

In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatic or block diagram form in order not to obscure the present invention unnecessarily.

Figure 1:
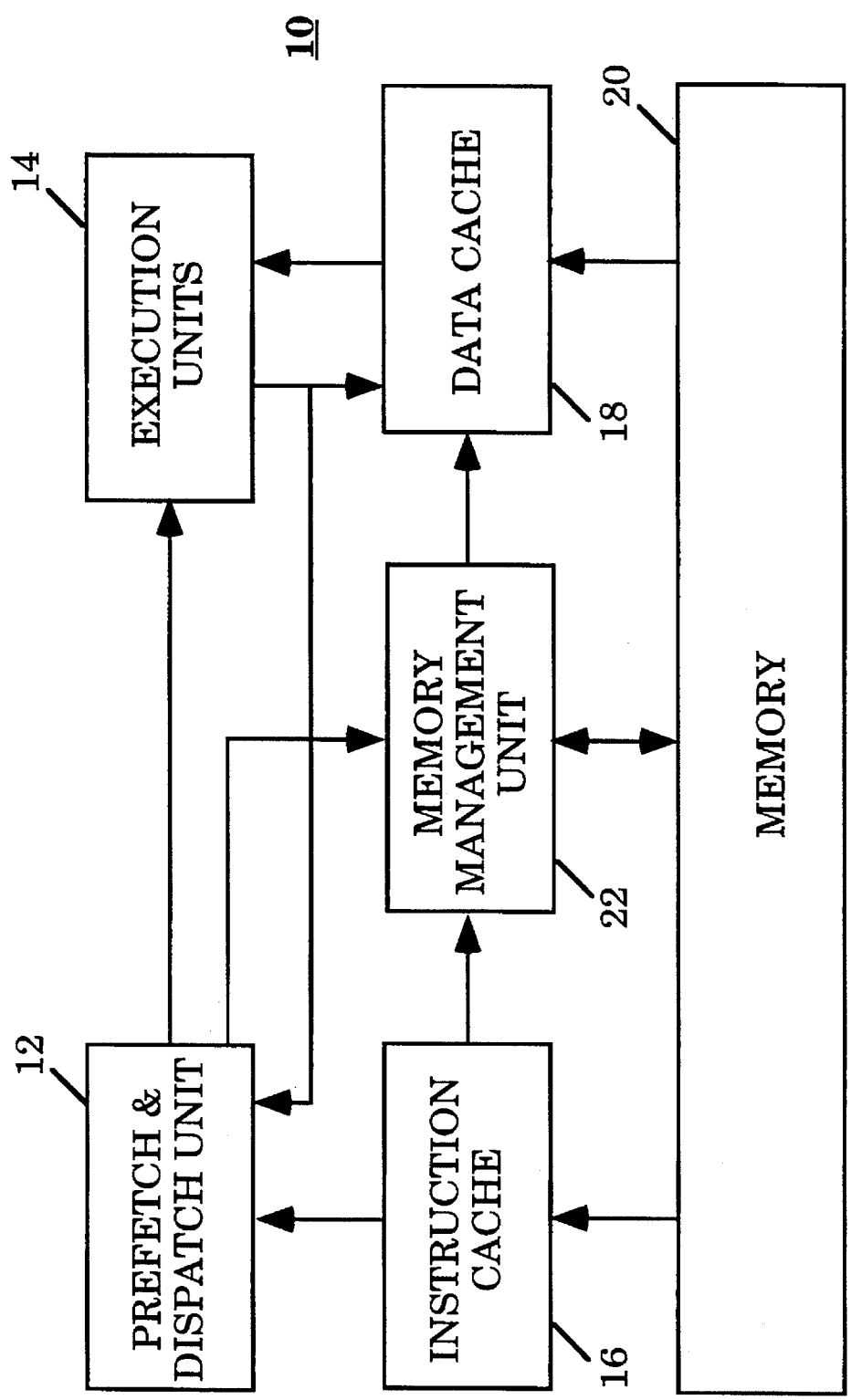
FIG. 1 is a functional diagram of an exemplary computer system incorporated with the teachings of the present invention.

Referring now to FIG. 1, a functional block diagram illustrating a computer system incorporating the teachings of the present invention is shown. Shown is a computer system 10 comprising an instruction prefetch and dispatch unit (PDU) 12 coupled to a number of execution units 14. Examples of execution units 14 include but not limited to integer and floating point units. The computer system 10 further comprises an instruction cache 16 and a data cache 18 coupled to a memory unit 20. The instruction and data caches, 16 and 18, are also coupled to the instruction prefetch and dispatch unit 12 and the execution units 14 respectively. Additionally, the computer system 10 comprises a memory management unit (MMU) 22 coupled to the instruction prefetch and dispatch unit 12, the instruction and data caches, 16 and 18, and to the memory unit 20. Memory space is partitioned into pages, and the instruction cache 16 is physically addressed. The instruction cache size is larger than the memory page size. In one embodiment, the instruction cache size is 16 kB, whereas the memory page size is 8 kB. The MMU 22 provides among other functions, translation of virtual addresses into physical addresses. The least significant bits (LSBs) of the virtual addresses are not translated, therefore, they are the same for both virtual and physical addresses. The most significant bits (MSB) of the physical addresses are translated from the MSBs of their counterpart virtual addresses. Cooperatively, instructions are fetched from the memory unit 20, dispatched to the execution units 14 for execution, and the execution results are stored back into the memory unit 20. Except for the instruction cache 16, the other elements, 12–14, and 18–22, are intended to represent a broad category of these elements found in most computer systems. The constitutions and basic functions of these other elements, 12–14, and 18–22, are well known and will not be described further. The instruction cache 16, in particular, the teachings of the present invention enabling rapid retrieval of instructions from the instruction cache 16, will be described in further detail below with references to the remaining figures.

While the present invention is being described with the computer system illustrated in FIG. 1, based on the descriptions to follow, it will be appreciated that the present invention may be practiced with other computer systems having different architectures. The translation of virtual addresses to physical addresses may include other control and/or contextual information. Furthermore, it will be appreciated that the present invention may also be practiced with other physically addressed data storage structures beside physically addressed instruction caches, such as data cache and multi-bank memory system.

Figure 2:
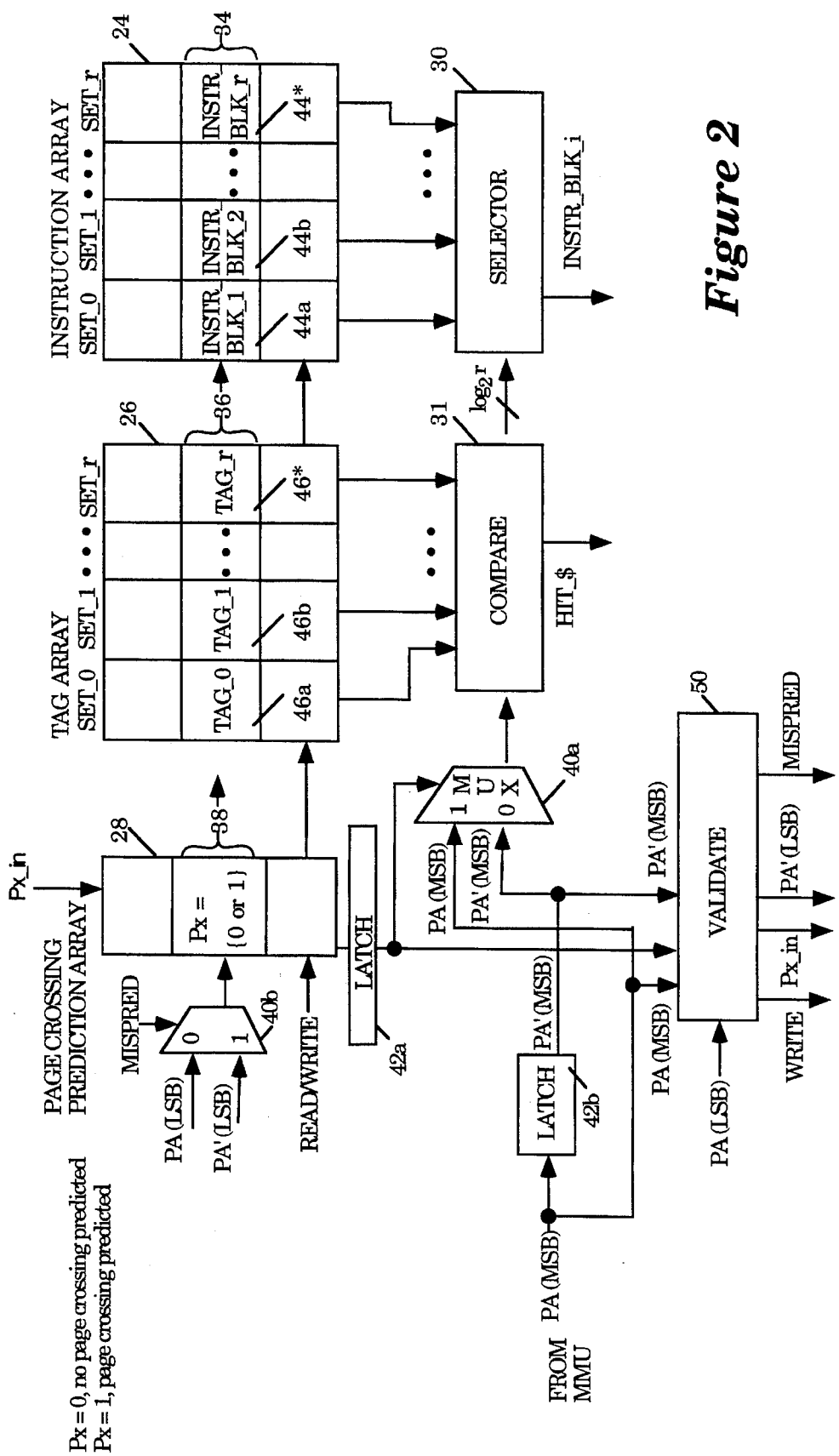
FIG. 2 shows the relevant portions of the presently preferred embodiment of the physically addressed instruction cache of FIG. 1 in further detail.

Referring now FIG. 2, a block diagram illustrating the relevant portions of the presently preferred embodiment of the physically addressed instruction cache of FIG. 1 in further detail is shown. Shown is a set associative cache array 24, its corresponding tag array 26, and a corresponding memory page crossing prediction array 28. An instruction block selector 30 is coupled to the cache array 24 and comparator 31 is coupled to the tag array 26. Additionally, a first multiplexor 40a coupled to a first and a second latch 42a–42b is also coupled to the comparator 31. The first and second latches 42a–42b are in turn coupled to the prediction array 28 and the MMU 22 respectively. Furthermore, a validator 50 is also coupled to the first and second latches 42a–42b and the MMU 22. Lastly, a second multiplexor 40b is coupled to the prediction array 28, and the validator 50. Together, as will be described in further detail below, these elements cooperate to rapidly retrieve instruction blocks stored in the cache array 24.

As it is well known in the art, the cache array 24 comprises a number of cache lines 34, each having r sets of instruction blocks 44a–44*. Each instruction block 44a–44* in turn comprises a plurality of instructions. Similarly, as it is also well known in the art, the cache tag array 26 comprises a number of cache tag entries 36 corresponding to the cache lines 34, each cache tag entry 36 having r cache tags 46a–46* for selecting instruction blocks 44a–44* in the corresponding cache line 34. Likewise, the memory page crossing prediction array 28 of the present invention comprises a number of memory page crossing predictive annotations (PX) 38 corresponding to the cache lines 34. Under the presently preferred embodiment, each PX 38 of the present invention predicts whether the next access of the cache array 24 will cross into a new memory page or not. As illustrated, a PX 38 is set to "0" to denote a no memory page crossing prediction, and "1" to denote a memory page crossing prediction. A cache line 34, and its corresponding cache tag entry 36, and PX 38, are accessed and read out of their respective structures 24–28 concurrently using the LSBs of an accessing physical address. When physical mapping changes, the cache lines 34 are flushed.

In accordance to the present invention, the PXs 38 are used to control whether selection of instruction blocks during accesses are made speculatively without waiting for the physical addresses to be translated from the virtual addresses, or non-speculatively after the translation. As will be obvious from the description to follow, the control is effectuated by using the PXs 38 to control the address inputs to the comparator 31. The PXs 38 are initialized when their corresponding cache lines 34 are allocated, and individually corrected when an initialized prediction is subsequently determined to be incorrect. Since inherently most accesses do not cross memory pages, preferably the PXs 38 are initialized to predict no memory page crossing, and individually corrected to predict memory page crossing only when subsequently determined to be incorrect. As will be also obvious from the descriptions to follow, under the preferred approach, for simplicity, since the cache lines 34 are flushed when physical mapping changes, once corrected, a PX 38 will not be corrected again from predicting memory page crossing to no memory page crossing. Alternatively, the present invention may also be practiced with the PXs 38 checked even when they predict memory page crossing, and corrected if the predictions are incorrect. Usage of the PXs 38 will be described in more detail below.

As it is well known in the art, the instruction block selector 30 and the comparator 31 are used to select an instruction block among the r instruction blocks 44a–44, being read out of the cache array 24 during an access. The desired instruction block, instr_blk_i, is selected by the selector 30 using the comparison result output of the comparator 31. The comparison result output is generated by the comparator 31 by comparing the tags 46a–46* currently being read out against an address input provided to the comparator 31. Thus, by using the PX 38 of the immediately preceding access to control whether the address input of the current access to the comparator 31 is provided speculatively or non-speculatively, whether instr_blk_i is selected speculatively or non-speculatively by the instruction block selector 30 in cooperation with the comparator 31 is controlled.

In accordance to the present invention then, a first multiplexor 40a is provided to selectively provide the speculative and non-speculative address input to the comparator 31 in accordance to the PX 38 of the immediately preceding access. More specifically, the first multiplexor 40a is used to selectively output either the MSBs of the immediately preceding accessing physical address speculatively if the PX 38 of the immediately preceding access predicts no memory page crossing, or the MSBs of the current accessing physical address non-speculatively if the PX 38 of the immediately preceding access predicts memory page crossing.

A first latch 42a is provided to provide the PX 38 of the immediately preceding access to the first multiplexor 40a during the current access. The first latch 42a successively records the PXs 38 read out of the predictive annotation structure 28 in response to the LSBs of accessing physical addresses provided by the instruction PDU 12, one at a time, with the PX 38 of the current access superseding the PX 38S of the immediately preceding access. However, because of read out delay, the recorded PX 38 in the first latch 42a, at the time the LSBs of the current accessing physical address are used to access the prediction array 28, is still the PX 38 of the immediately preceding access. Thus, at the time the LSBs of the current accessing physical address are used to access the prediction array 28, the first multiplexor 40a is controlled by the PX 38 of the immediately preceding access in lieu of the PX 38 of the current access.

The MSBs of the current accessing physical address is provided to the first multiplexor 40a directly from the MMU 22. Similarly, a second latch 42b is further provided to store and provide the first multiplexor 40a with the MSBs of the immediately preceding accessing physical address. The second latch 42b successively records thee MSBs of the accessing physical addresses from successive accesses, one at a time, with the MSBs of the current accessing physical address superseding the MSBs of the immediately preceding accessing physical address. However, because of translation delay, the MSBs of the current accessing physical address are available from the MMU 22 later in time, after the LSBs of the current accessing physical address are made available from the instruction PDU 12. Therefore, the recorded MSBs in the second latch 42b, at the time the LSBs of the current accessing physical address are made available from the PDU,12, are still the MSBs of the immediately preceding accessing physical address. Thus, when the first multiplexor 40a outputs the content of the second latch 42b at the time the LSBs of the current accessing physical address are made available from the PDU 12, the first multiplexor 40a is speculatively outputting the MSBs of the immediately preceding accessing physical address as the address input to the comparator 31 in lieu of the MSBs of the current accessing physical address. Alternatively, the present invention may be practiced with the latching of the MSBs of the accessing physical addresses being performed only when there is a misprediction or when memory page crossing is predicted.

Figure 3:
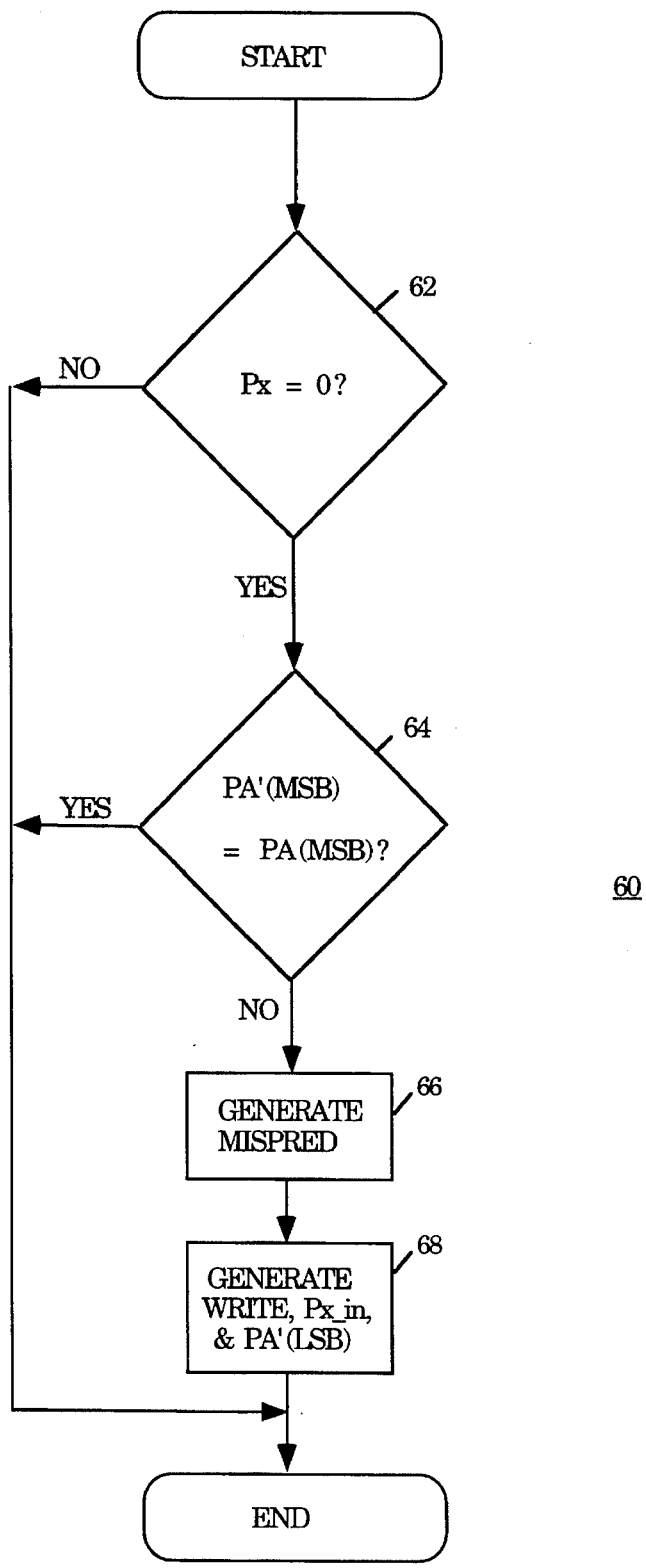
FIG. 3 illustrates the operation flow of the validation circuit of FIG. 2.

Since the PXs 38 are initialized to predict no memory page crossing when the cache lines 34 are allocated, inevitably some of the predictions are going to be incorrect. Thus, a validator 50 is further provided to determine whether a speculatively selected instruction block (instr_blk_i) is valid or not. Referring now also to FIG. 3, the validator 50 first determines whether instr_blk_i is speculatively selected, by checking whether the recorded PX 38 of the immediately preceding access predicts memory page crossing or not, step 62. If instr_blk_i is not speculatively selected, i.e. the recorded PX 38 of the immediately preceding access predicts memory page crossing, the validator 50 takes no further action. The validator 50 takes no further action because instr_blk_i selected non-speculatively is always valid. On the other hand, if instr_blk_i is speculatively selected, i.e. the recorded PX 38 of the immediately preceding access predicts no memory page crossing, the validator 50 further determines whether the speculation was correct or not, by checking whether the MSBs of the physical addresses of the current (PA) and immediately preceding (PA') accesses are equal, step 64.

If the MSBs of the physical addresses of the current and immediately preceding accesses are equal, the validator 50 also takes no further action. The validator 50 takes no further action because the speculation is correct, i.e. instr_blk_i is valid. Otherwise, the validator 50 generates an invalid signal (MISPRED) to the instruction PDU 12, causing the speculative selected instruction block to be invalidated, step 66. Furthermore, the validator 50 generates a corrected memory page prossing predictive annotation (PX_in), the LSBs of the immediately preceding access, and a write cycle, causing the incorrect memory page crossing predictive annotation 38 to be corrected to predict memory page crossing, step 68.

As illustrated in FIG. 2, the validator 50 receives the LSBs of the accessing physical addresses, and tracks at least the LSBs of the immediately preceding access. Furthermore, a second multiplexor 40b under the control of the MISPRED signal is provided to allow the LSBs of the immediately preceding access to be used, in lieu of the LSBs of the current access, to write the correcting PX_in into the appropriate PX 38.

It will be appreciated then, since the PX and the MSBs of the immediately preceding access are pre-recorded in the latches 42a–42b, the first multiplexor 40a outputs them right away. Whereas, the MSBs of the current accessing physical address are available from the MMU 12 at a later point in time, the first multiplexor 40a effectively has to wait before it can output them. In other words, speculative selections are made right away, without having to wait for the MSBs of the physical address of the current access to be generated. Whereas, non-speculative selections are made at a later point in time, after the MSBs of the physical address of the current access are generated. In the case of the exemplary set associative instruction cache, the set determination can be made right away, leading to earlier availability of the requested instruction. In the case of a direct mapped instruction cache, the instruction read out of the cache array can be used right away. Since the memory page size is relatively large and the instruction cache size is even larger, PXs 38 will inherently predict no memory page crossing a lot more often than memory page crossing. Therefore, most of the instruction selections are speculatively made right away without waiting for the translation of the accessing virtual addresses. Since the no memory page crossing predictions are also inherently correct most of the time, instructions are retrieved from the physically addressed cache with improved efficiency.

Figure 4:
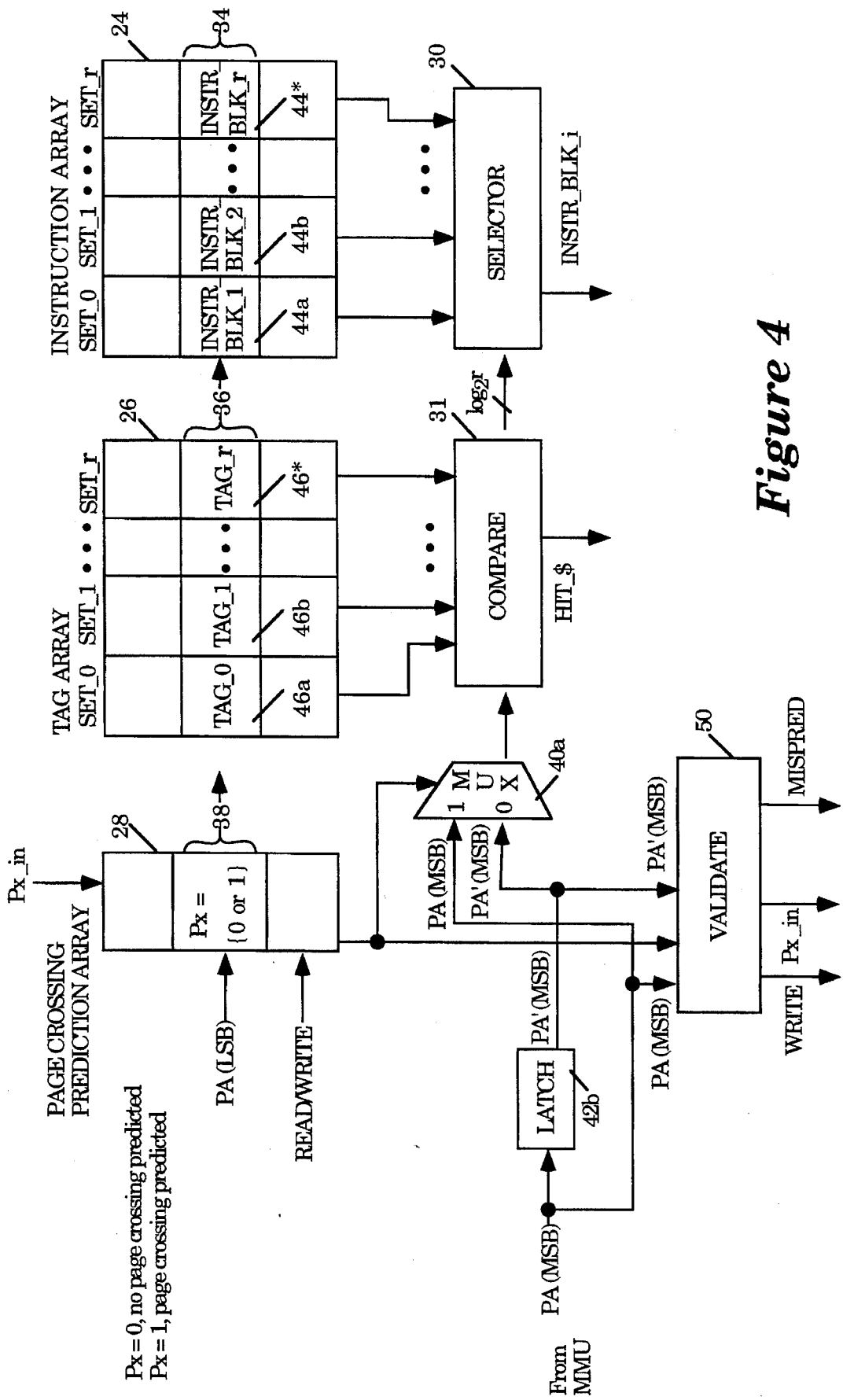
FIG. 4 illustrates the relevant portions of an alternate embodiment of the physically addressed instruction cache of FIG. 1 in further detail.

Referring now to FIG. 4, a block diagram illustrating an alternate embodiment of the physical addressed instruction cache of FIG. 1 in further detail is shown. The alternate embodiment comprises similar elements and operates in substantially the same manner as the presently preferred embodiment with the exceptions that:

1) Each of the PXs 38 predicts whether the current access (instead of the next access) will cross into a new memory page or not.

2) The first latch (42a of FIG. 2) is not provided. The first multiplexor 40a is controlled by the PX 38 currently being read out of the prediction array 28 (instead of the recorded PX 38).

3) The validator 50 does not generate the LSBs of the immediately preceding access when it corrects an incorrect PX 38 due to a misprediction, since it is the PX 38 currently being read out of the prediction array 28 that has to be corrected. Thus, the validator 50 neither receives nor tracks at least the LSBs of the immediately preceding access.

4) The second multiplexor (40b of FIG. 2) is also not provided, since it is no longer necessary to provide the address of the PX 38 of the immediately access for prediction correction.

The primary effect of these differences is that the alternate embodiment will make a speculative selection at a slightly later point in time as compared to the presently preferred embodiment, because multiplexor 40a in the alternate embodiment will output the MSBs of the immediately preceding access at a slightly later point in time as compared to the presently preferred embodiment, due to the read out delay of the current PX 38. However, the alternate embodiment might be more accurate in memory page crossing prediction over the presently preferred embodiment because each PX 38 predicts for the current access instead of the next access. It is conceivable that for certain applications that the increase in prediction accuracy is sufficient to offset the delay in speculative selection, leading to improved performance with the alternate embodiment over the presently preferred embodiment.

Figure 5:
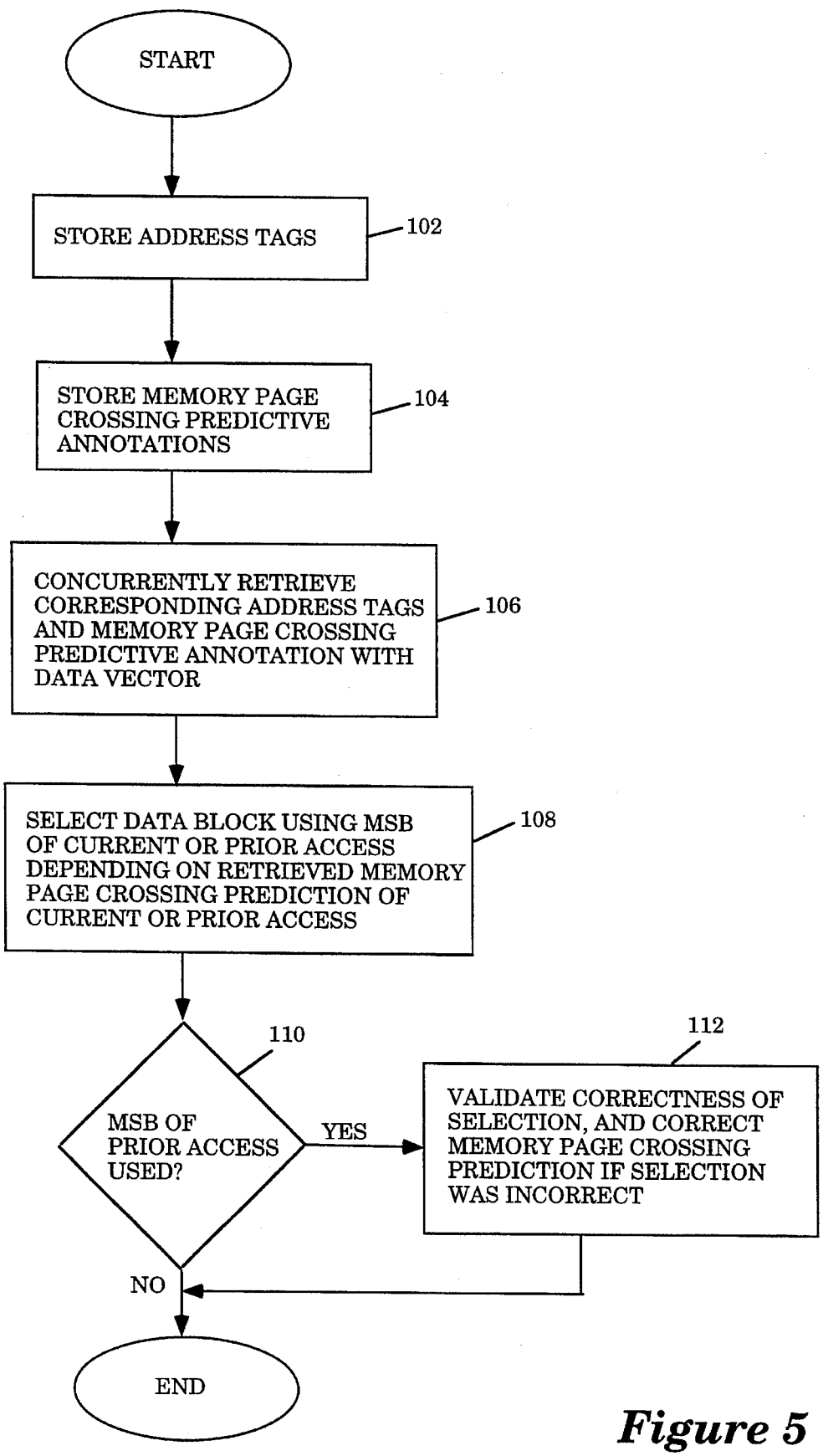
FIG. 5 summarizes the method steps of the present invention.

While the present invention is being described and illustrated herein with the exemplary physically addressed set associative instruction cache having separate cache tag array and memory page crossing predictive annotation array, those skilled in the art will recognize that the invention is not limited to the exemplary embodiment described. The method and apparatus of the present invention can be practiced with modification and alteration within the spirit and scope of the appended claims. In particular, it will be appreciated that the present invention may be practiced with the instruction cache mapped in other well-known manners such as direct mapping. The cache tag and memory page crossing prediction arrays may be combined. For example, the memory page crossing predictive annotations may be added to the control information, such as replacement bits, valid bits, commonly found in cache tags. Additionally, the present invention may also be practiced in conjunction with the set predictive annotations described in copending U.S. patent application Ser. No. 07/906,699 filed on Jun. 30, 1992, entitled *Rapid Data Retrieval From Data Storage Structures Using Prior Access Predictive Annotations*, now U.S. Pat. No. 5,392,411 and the next fetch and branch predictive annotations described in copending U.S. patent application Ser. No. 07/938,371, filed on Aug. 31, 1992, entitled *Rapid Instruction (Pre)fetching And Dispatching Using Prior (Pre)fetch Predictive Annotations*, now abandoned, continuation is being filed. Both copending applications are invented/coinvented by the inventor of the present application, and assigned to the assignee of the present application. The description is thus to be regarded as illustrative instead of limiting on the present invention. Finally, the above described method steps are summarized in FIG. 5.

What is claimed is:

1. In a computer system comprising a data storage structure having a plurality of data vectors, said data storage structure being physically addressed with physical addresses of a physical address space partitioned into a plurality of address pages, and each of said plurality of data vectors having a plurality of data blocks, wherein a currently addressed one of said plurality of data vectors is retrieved during a current access based on a first portion of a current physical address of the current access, a method for rapidly retrieving data from said data storage structure, said method comprising the steps of:

a) storing a plurality of description vectors corresponding to said plurality of data vectors in a description storage structure, the description storage structure being physically addressed with said physical addresses also, each of said plurality of description vectors comprising a plurality of descriptors corresponding to said plurality of data blocks;

b) storing a plurality of predictive annotations corresponding to said plurality of data vectors in a predictive annotation storage structure, the predictive annotation storage structure being physically addressed with said physical addresses also, each of said plurality of predictive annotations predicting whether a next access will cross into a new address page;

c) retrieving a corresponding one of said plurality of descriptors and a corresponding one of said plurality of predictive annotations concurrently with the current retrieval of the currently addressed data vector based on the first portion of the current physical address during the current access; and d) selecting a data block from the currently retrieved data vector based on either a second portion of the current physical address of the current access or a second portion of a prior physical address of a prior access, depending on whether a retrieved predictive annotation predicts address page crossing or not, the retrieved predictive annotation being retrieved during either the current or an earlier access, and whether the retrieved predictive annotation of the current access or the retrieved predictive annotation of an earlier access, including which particular earlier access, is to be used for the data block selection is predetermined.

2. The method as set forth in claim 1, wherein, said method further comprises the steps of:

e) conditionally determining whether the second portions of the physical addresses of the current and the recorded preceding accesses are identical, in accordance to the predictive annotation retrieved for the immediately preceding access; and f) conditionally correcting the predictive annotation retrieved for the immediately preceding access in said predictive annotation storage structure, in accordance to the conditional determination results.

3. The method as set forth in claim 2, wherein, said selection data storage and said predictive annotation structures are logical subsets of a merged selection data and predictive annotation storage structure; and each of said selection data vector and its corresponding predictive annotation are logical subsets of a merged selection data and predictive annotation vector.

4. The method as set forth in claim 2, wherein, said computer system has a memory space partitioned into memory pages;

said physically addressed data storage structure is a cache array of a physically addressed n-way set associative instruction cache, said data vectors being cache lines, n being an integer greater than or equal to one;

said physically addressed selection storage structure in said step a) is a cache tag array of said physically addressed n-way set associative instruction cache, said selection data vectors being cache tag entries, said selection data being address tags with associated control information; and the first and second portions of the physical addresses are lower and higher ordered bits of the physical addresses respectively.

5. The method as set forth in claim 4, wherein, said instruction block selection in said step c) is performed using the second portion of the recorded preceding physical address of the recorded preceding access if the predictive annotation retrieved for the immediately preceding access predicts no memory page crossing; and said instruction block selection in said step c) is performed using the second portion of the current physical address of the current access if the predictive annotation retrieved for the immediately preceding access predicts memory page crossing.

6. The method as set forth in claim 1, wherein, said prior physical address of step (d) is an immediately preceding physical address;

said prior access of step (d) is an immediately preceding access;

said data block selection of step (d) is performed using either the second portion of the current physical address of the current access or the second portion of the immediately preceding physical address of the immediately preceding access, depending on whether the retrieved predictive annotation used for data block selection predicts address page crossing or not; and said method further comprises the step of (e) latching the second portion of the immediately preceding physical address of the immediately preceding access during the immediately preceding access, said step (e) being performed prior to said steps (c) and (d).

7. The method as set forth in claim 1, wherein, said prior physical address is a prior physical address of a prior access where a last misprediction occurred;

said prior access is the prior access where the last misprediction occurred;

said data block selection in said step (d) is performed using either the second portion of the current physical address of the current access or the second portion of the prior physical address of the prior access where the last misprediction occurred, depending on whether said retrieved predictive annotation used predicts address page crossing or not; and said method further comprises the step of (e) latching the second portion of the physical address of the prior access where the last misprediction occurred when the last misprediction was detected, said step (e) being performed prior to said steps (c) and (d).

8. The method as set forth in claim 1, wherein the retrieved predictive annotation used for data block selection is predetermined to be the retrieved predictive annotation of an earlier access, and the earlier access is predetermined to be an access immediately preceding the current access; and the method further comprises the step of (e) latching the retrieved predictive annotation of the immediately preceding access during the immediately preceding access, said step (e) being performed before said steps (c) and (d).

9. The method as set forth in claim 1, wherein the retrieved predictive annotation used for data block selection is predetermined to be the retrieved predictive annotation of the current access.

10. In a computer system comprising a first storage unit for storing a data storage structure having a plurality of data vectors, said data storage structure being physically addressed with physical addresses of a physical address space partitioned into a plurality of address pages, and each of said plurality of data vectors having a plurality of data blocks, wherein said first storage unit outputs a currently addressed one of said data vectors during a current access in response to a first portion of a current physical address of the current access, an apparatus for rapidly retrieving data from said physically addressed data storage structure, said apparatus comprising:

a) a second storage unit for storing a plurality of description vectors corresponding to plurality of in a description storage structure, the description storage structure being physically addressed with said physical addresses also, and each of said plurality of description vectors comprising a plurality of descriptors corresponding to said plurality of data blocks, wherein said second storage unit outputs a corresponding one of said plurality of descriptor vectors concurrently with the outputting of the currently addressed data vector by said first storage unit in response to the first portion of the current physical address;

b) a third storage unit for storing a plurality of predictive annotations corresponding to said plurality of data vectors of a predictive annotation storage structure corresponding to said data storage structure, said predictive annotation storage structure being physically addressed with said physical addresses also, and each of said plurality of predictive annotations predicting whether a next access will cross into a new address page, wherein said third storage unit outputs a corresponding one of said plurality of predictive annotations concurrently with the outputting of the currently addressed data vector output by said first storage unit in response to the first portion of the current physical address; and c) selection circuitry coupled to said first, second and third storage units for selecting a data block from the currently retrieved data vector based on either a second portion of the current physical address of the current access or a second portion of a prior physical address of a prior access, depending on whether a retrieved predictive annotation predicts address page crossing or not, the retrieved predictive annotation being retrieved during either the current or an earlier access, and whether the retrieved predictive annotation of the current access or the retrieved predictive annotation of an earlier access, including which particular earlier access, is to be used for the data block selection is predetermined.

11. The apparatus as set forth in claim 10, wherein, said apparatus further comprises:

d) validation circuitry coupled to said third storage unit for conditionally determining whether the second portions of the current and the prior physical addresses are identical, whenever the retrieved predictive annotation used for data block selection predicts address page crossing, and when said determination is performed, conditionally correcting the predictive annotation in said predictive annotation storage structure from which the retrieved predictive annotation used for data block selection was output, if the determination result is not identical.

12. The apparatus as set forth in claim 10, wherein, said second and third storage units are the same storage unit storing a merged description and predictive annotation storage structure, said description and said predictive annotation storage structures being logical subsets of said merged description and predictive annotation storage structure; and each of said plurality of description vectors and the corresponding predictive annotation are logical subsets of a merged description and predictive annotation vector.

13. The apparatus as set forth in claim 10, wherein, said physical address space partitioned into a plurality of address pages is a memory space partitioned into a plurality of memory pages;

said data storage structure is a cache array of a n-way set associative instruction cache, where n is an integer greater than or equal to one, said plurality of data vectors being instruction cache lines, said plurality of data blocks being instruction blocks;

said description storage structure is a cache tag array of said n-way set associative instruction cache, said plurality of description vectors being cache tag entries, said plurality of descriptors being address tags with associated control information;

the first and second portions of the physical addresses are lower and higher ordered bits of the physical addresses respectively.

14. The apparatus as set forth in claim 12, wherein, said selection circuitry selects said instruction block using the second portion of the prior physical address of the prior access if the retrieved predictive annotation used predicts no memory page crossing, and said selection circuitry selects said instruction block using the second portion of the current physical address of the current access if the retrieved predictive annotation used predicts memory page crossing.

15. The apparatus as set forth in claim 9, wherein, said prior physical address is an immediately preceding physical address;

said prior access is an immediately preceding access;

said apparatus further comprises a multiplexor coupled to the selection circuitry for providing either the second portion of the current physical address of the current access or the second portion of the immediately preceding physical address of the immediately preceding access to the selection circuitry, depending on whether the retrieved predictive annotation used for data block selection predicts address page crossing or not; and a latch coupled to the multiplexor for latching the second portion of the immediately preceding physical address of the immediately preceding access during the immediately preceding access and providing the latched second portion of the immediately preceding physical address of the immediately preceding access to the multiplexor during the current access.

16. The apparatus as set forth in claim 9, wherein, said prior physical address is a prior physical address of a prior access where a last misprediction occurred;

said prior access is the prior access where the last misprediction occurred;

said apparatus further comprises a multiplexor coupled to said selection circuitry for providing either the second portion of the current physical address of the current access or the second portion of the prior physical address of the prior access where the last misprediction occurred to said selection circuitry, depending on whether said retrieved predictive annotation used predicts address page crossing or not;

a latch coupled to the multiplexor for latching the second portion of the physical address of the prior access where the last misprediction occurred when the last misprediction was detected, and providing the latched second portion of the physical address of the prior access where the last misprediction occurred to the multiplexor during the current access.

17. The apparatus as set forth in claim 1, wherein the retrieved predictive annotation used for data block selection is predetermined to be the retrieved predictive annotation of an earlier access, and the earlier access is predetermined to be an access immediately preceding the current access; and the apparatus further comprises a latch coupled to the third storage unit and multiplexor for latching the retrieved predictive annotation of the immediately preceding access during the immediately preceding access, and outputting the latched predictive, annotation to control the multiplexor during the current access.

18. The apparatus as set forth in claim 1, wherein the retrieved predictive annotation used for data block selection is predetermined to be the retrieved predictive annotation of the current access.

* * * * *